(12) United States Patent
Kim et al.

(10) Patent No.: US 8,873,802 B2
(45) Date of Patent: Oct. 28, 2014

(54) METHOD AND APPARATUS FOR CAMERA TRACKING

(75) Inventors: Jiwon Kim, Seoul (KR); Guofeng Zhang, ZijinGang Campus (CN); Du Sik Park, Suwon-si (KR); Ho Young Lee, Suwon-si (KR); Haomin Liu, ZijinGang Campus (CN); Hujun Bao, ZijinGang Campus (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 373 days.

(21) Appl. No.: 13/447,661

(22) Filed: Apr. 16, 2012

(65) Prior Publication Data

US 2013/0182894 A1 Jul. 18, 2013

(30) Foreign Application Priority Data

Jan. 18, 2012 (KR) ........................ 10-2012-0005745

(51) Int. Cl.
*G06K 9/00* (2006.01)

(52) U.S. Cl.
USPC .......................................... 382/103; 382/218

(58) Field of Classification Search
CPC ........... G06T 2207/20088; G06T 2207/30241; G06T 2207/30244; G06T 7/00; G06T 7/0065; G06T 7/2033
USPC .................................................. 382/103, 218
See application file for complete search history.

(56) References Cited

U.S. PATENT DOCUMENTS

| | | | |
|---|---|---|---|
| 6,571,024 B1 * | 5/2003 | Sawhney et al. | 382/294 |
| 7,847,826 B2 | 12/2010 | Baker et al. | |
| 7,995,116 B2 | 8/2011 | Pillman et al. | |
| 8,339,459 B2 * | 12/2012 | Zhang et al. | 348/169 |
| 2004/0257452 A1 | 12/2004 | Chang et al. | |
| 2005/0190972 A1 * | 9/2005 | Thomas et al. | 382/218 |
| 2008/0031543 A1 | 2/2008 | Nakajima et al. | |
| 2009/0207257 A1 | 8/2009 | Jung et al. | |

FOREIGN PATENT DOCUMENTS

| | | |
|---|---|---|
| JP | 2003-141527 | 5/2003 |
| JP | 2003-279310 | 10/2003 |
| JP | 2007-255955 | 10/2007 |
| JP | 2011-035642 | 2/2011 |

* cited by examiner

*Primary Examiner* — Tom Y Lu
(74) *Attorney, Agent, or Firm* — Staas & Halsey LLP

(57) ABSTRACT

A camera pose tracking apparatus may track a camera pose based on frames photographed using at least three cameras, may extract and track at least one first feature in multiple-frames, and may track a pose of each camera in each of the multiple-frames based on first features. When the first features are tracked in the multiple-frames, the camera pose tracking apparatus may track each camera pose in each of at least one single-frame based on at least one second feature of each of the at least one single-frame. Each of the at least one second feature may correspond to one of the at least one first feature, and each of the at least one single-frame may be a previous frame of an initial frame of which the number of tracked second features is less than a threshold, among frames consecutive to multiple-frames.

18 Claims, 9 Drawing Sheets

METHOD AND APPARATUS FOR CAMERA TRACKING

CROSS-REFERENCE TO RELATED APPLICATIONS

This application claims the priority benefit of Korean Patent Application No. 10-2012-0005745, filed on Jan. 18, 2012, in the Korean Intellectual Property Office, the disclosure of which is incorporated herein by reference.

BACKGROUND

1. Field

The following description relates to a method and apparatus to track a pose of a camera, and more particularly, to a method and apparatus to track a pose of each camera based on frames photographed using at least three cameras.

2. Description of the Related Art

Camera tracking may be a basic issue in a computerized vision system. Camera tracking aims to automatically recover a camera motion from a video sequence. A basic idea of camera tracking is to select scene points appearing in a sequence of frames, and to simultaneously estimate three-dimensional (3D) positions of the selected scene points and the camera motion based on a set of correspondences of two-dimensional (2D) points.

Camera tracking may have many applications such as depth recovery, 3D reconstruction, location recognition, and autonomous robot navigation, for example.

In particular, with the prevalence of digital cameras, monocular cameras are already easily accessible and prices of the monocular cameras are becoming cheaper. Accordingly, methods of tracking monocular cameras are widely used.

However, 3D information of dynamic objects may not be recovered from an image photographed using a monocular camera. Due to accumulation errors, it may be difficult to precisely recover a camera motion for large-scale scenes from the image photographed using the monocular camera.

Several methods have been proposed to recover a camera motion and depth maps using stereo cameras. However, when images are photographed using stereo cameras, it may be difficult to handle occlusions in an image.

SUMMARY

The foregoing and/or other aspects are achieved by providing a method to track a camera pose based on frames photographed using at least three cameras, the method including extracting and tracking at least one first feature in multiple-frames, and tracking a pose of each camera in each of the multiple-frames based on first features, and tracking a pose of each camera in each of at least one single-frame based on at least one second feature of each of the at least one single-frame. Each of the at least one second feature may correspond to one of the at least one first feature, and each of the at least one single-frame may be a previous frame of an initial frame of which the number of tracked second features is less than a threshold, among frames consecutive to multiple-frames.

The tracking may include extracting third features from at least three images of a first frame in the multiple-frames, tracking the third features up to a last frame in the multiple-frames, determining the first features by removing features having dynamic trajectories from the tracked third features, and estimating a pose of each camera in each of the multiple-frames based on the first features.

The extracting of the third features may include extracting points from the at least three images of the first frame to generate scale invariant feature transform (SIFT) descriptors, and generating the third features by matching the extracted points using descriptor comparison between the generated SFIT descriptors and by connecting matched points as a feature.

The extracting of the third features may further include removing outliers in the third features using geometry constraints.

The geometry constraints may include at least one of an epipolar constraint, a re-projection constraint, and a depth range constraint.

The tracking may include setting a subsequent frame of the multiple-frames as a current frame, extracting the second features corresponding to one of the first features in the current frame, estimating a pose of each camera in the current frame when the number of second features is greater than or equal to the threshold, and setting a subsequent frame of the current frame as a new current frame, and extracting the second features in the new current frame when the number of second features is greater than or equal to the threshold.

The tracking may include tracking again a pose of each camera in each of the multiple-frames when the number of second features is less than the threshold.

The foregoing and/or other aspects are achieved by providing an apparatus for tracking a camera pose based on frames photographed using at least three cameras, the apparatus including a multiple-frames processing unit to extract and track at least one first feature in multiple-frames, and to track a pose of each camera in each of the multiple-frames based on first features, and a single-frame processing unit to track a pose of each camera in each of at least one single-frame based on at least one second feature of each of the at least one single-frame. Each of the at least one second feature may correspond to one of the at least one first feature, and each of the at least one single-frame may be a previous frame of an initial frame of which the number of tracked second features is less than a threshold, among frames consecutive to multiple-frames.

The multiple-frames processing unit may include a feature extractor to extract third features from at least three images of a first frame in the multiple-frames, a feature tracking unit to track the third features up to a last frame in the multiple-frames, a dynamic point detector to determine the first features by removing features having dynamic trajectories from the tracked third features, and a camera pose estimator to estimate a pose of each camera in each of the multiple-frames based on the first features.

The dynamic point detector may compute a fourth-dimensional (4D) trajectory subspace of each of the third features, and may determine whether each of the third features has a dynamic trajectory based on the 4D trajectory subspace.

The feature extractor may extract points from the at least three images of the first frame to generate SIFT descriptors, and may generates the third features by matching the extracted points using descriptor comparison between the generated SFIT descriptors and by connecting matched points as a feature.

The feature extractor may remove outliers in the third features using geometry constraints.

The single-frame processing unit may include a current frame setting unit to set a subsequent frame of the multiple-frames as a current frame, a current frame feature estimator to extracting the second features corresponding to one of the first features in the current frame, and a threshold comparator to estimate a pose of each camera in the current frame when the number of second features is greater than or equal to the threshold.

When the number of second features is greater than or equal to the threshold, the current frame feature setting unit may set a subsequent frame of the current frame as a new current frame, and may extracts the second features in the new current frame.

When the number of second features is less than the threshold, the multi-frames processing unit may be executed again.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
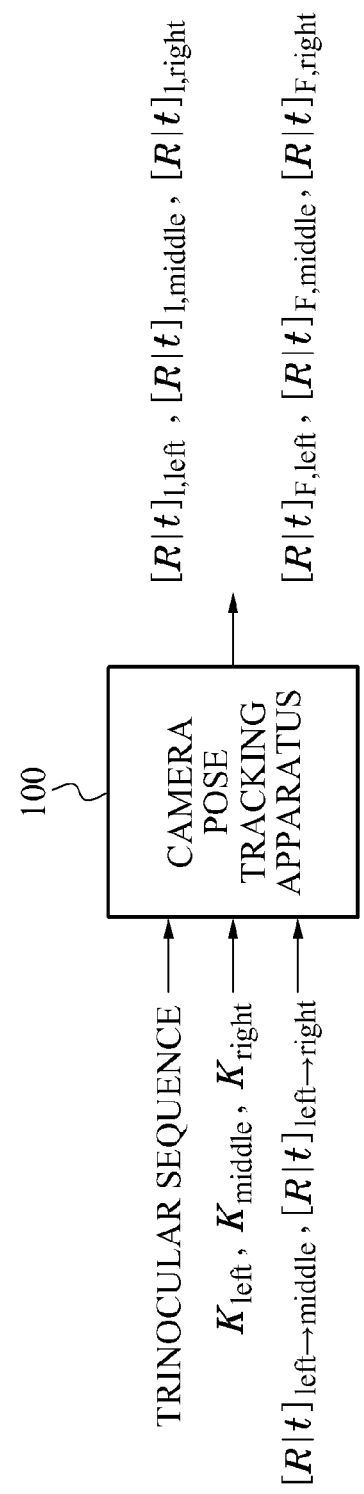
FIG. 1 illustrates a diagram to describe an operation of a camera tracking apparatus according to an embodiment.

Reference will now be made in detail to embodiments, examples of which are illustrated in the accompanying drawings, wherein like reference numerals refer to like elements throughout. Embodiments are described below to explain the present disclosure by referring to the figures.

A trinocular camera may include three synchronized cameras. The three synchronized cameras may be in a collinear configuration.

In the following, the term "pose" may be replaced with a position, and the term "sequence" may indicate series of images that are generated by consecutively capturing a scene. A trinocular sequence may indicate three sequences that are generated by consecutively capturing a scene by each of three cameras included in the trinocular camera.

A three-dimensional (3D) position M may be expressed as $[X, Y, Z]^T$. Here, X, Y, and Z may indicate an X coordinate, a Y coordinate, and a Z coordinate of a scene point, respectively. A two-dimensional (2D) image position m of the scene point may be expressed as $[u,v]^T$.

Camera transformation may be modeled as $K[R|t]$. In this example, K may be an intrinsic matrix and $[R|t]$ may be a projective matrix.

The intrinsic matrix may depend on an intrinsic property of a camera. The intrinsic property of the camera may encompass focal lengths in terms of pixels along an x axis and a y axis of the image, a skew ratio between the x axis and the y axis, and a principle point. The principle point may indicate the projection of a camera center onto an image plane.

An extrinsic matrix may model a camera motion including a rotation R and a translation t. Accordingly, a projection procedure may be represented as $\lambda m = K[R|t]M$. Here, $\lambda$ may indicate a scale factor. "Structure-from-motion" may indicate estimating of all the Ms and $[R|t]_s$ from image measurements m's.

When the selected scene points are all static, the above estimation may be highly reliable. However, when the scene includes a plurality of moving objects, some points may have more than a single 3D position during capture and thus, the above estimation may be seriously confused. To determine whether a point is static, whether all the pairs of 2D image positions corresponding to the point satisfy the epipolar geometry may be checked.

When a stereo rig is available, 3D positions of matched points may be more reliably computed through triangulation. Two images belong to the same frame, and a relative pose between a left view and a right view may be directly derived from the stereo rig.

Information associated with a 3D position may be used for feature tracking. The feature tracking may indicate connecting image points corresponding to the same scene point.

FIG. 1 illustrates a diagram to describe an operation of a camera tracking apparatus according to an embodiment.

When a trinocular camera capable of photographing a left image, a middle image, and a right image is used, a predetermined pixel in the middle image is seldom occluded in both the left image and the right image.

In addition, when the trinocular camera is used, three images may be obtained at each timestamp. Accordingly, a stronger geometry constraint compared to the epipolar geometry may be employed to accurately compute 3D positions of tracked features and to remove outliers.

In a configuration of the trinocular camera, relative poses among the three cameras in the trinocular camera may be assumed to be fixed. Further, intrinsic parameters of three cameras may be assumed to not vary during capture. Accordingly, input values of a camera pose tracking apparatus 100 may include trinocular sequences and intrinsic matrices and relative camera poses of three cameras. Output values of the camera pose tracking apparatus 100 may include an extrinsic matrix for each image. The extrinsic matrix may include a rotation matrix and a translation vector.

The intrinsic parameters and poses of three cameras may be calibrated by tools such as "camera calibration toolbox for Matlab", for example. When the extrinsic camera parameters of two cameras are $[R|t]_1$ and $[R|t]_2$, the relative pose between two cameras may be computed according to Equation 1:

$$[R_{1\to2}|t_{1\to2}] = \lfloor R_2 R_1^T | t_2 = R_2 R_1^T t_1 \rfloor \quad \text{Equation 1}$$

The trinocular sequence may be input to the camera pose tracking apparatus 100. Intrinsic matrices $K_{left}$, $K_{middle}$, and $K_{right}$ of three cameras included in the trinocular camera may be used as input parameters of the camera pose tracking apparatus 100. A projective matrix $[R|t]_{left \to middle}$ from the left camera to the middle camera and a projective matrix $[R|t]_{left \to right}$ from the left camera to the right camera may be used as input parameters of the camera pose tracking apparatus 100.

Once the intrinsic parameters and the relative poses of three cameras are computed, the camera pose tracking apparatus 100 may estimate 3D points of matched feature points among images captured by three cameras through triangulation.

When the 3D points of tracked features are computed, the camera pose tracking apparatus 100 may reliably and rapidly compute camera poses based on 3D-2D correspondences.

When the trinocular sequence includes F frames, the camera pose tracking apparatus 100 may output a position of each of three cameras for each frame. For example, $[R|t]_{1,left}$ may indicate a position of the left camera in a first frame, and $[R|t]_{F,right}$ may indicate a position of the right camera in an F-th frame corresponding to a last frame.

Figure 2:
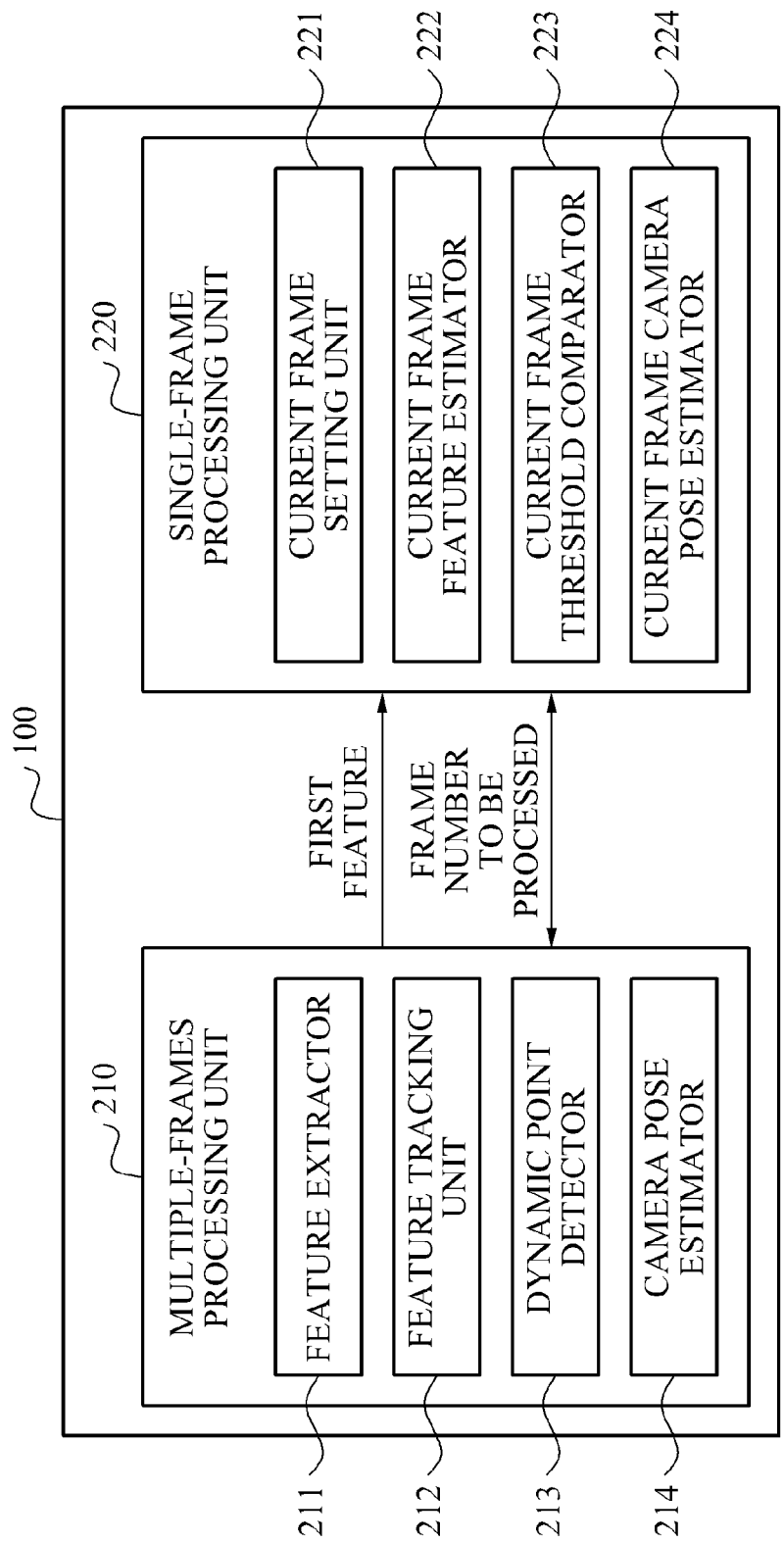
FIG. 2 illustrates a configuration of an apparatus for tracking a pose of a camera according to an embodiment.

FIG. 2 illustrates a configuration of a camera pose tracking apparatus 100 according to an embodiment.

The camera pose tracking apparatus 100 may track poses of cameras based on frames photographed using at least three cameras.

The camera pose tracking apparatus 100 may include a multiple-frames processing unit 210 and a single-frame processing unit 220.

The multiple-frames processing unit 210 may extract and track at least one first feature in multiple-frames, and may track a pose of each camera in each of the multiple-frames based on first features. The multiple-frames processing unit 210 may provide information associated with the first features to the single-frame processing unit 220.

The single-frame processing unit 220 may track a pose of each camera in each of at least one single-frame based on at least one second feature of each of the at least one single-frame. In this example, each of the at least one second feature may correspond to one of the at least one first feature, and each of the at least one single-frame may be a previous frame of an initial frame of which the number of tracked second features is less than a threshold, among frames consecutive to multiple-frames.

For example, when the multiple-frames processing unit 210 extracts and tracks the first features in the multiple-frames, the single-frame processing unit 220 may process, one by one, subsequent frames of frames that are processed by the multiple-frames processing unit 210. In this example, frame processing may indicate tracking of features in corresponding frames and track a pose of each camera in a frame. When the first features are provided from the multiple-frames processing unit 210 to the single-frame processing unit 220, the single-frame processing unit 220 may track second features in the subsequent frames of the frames that are processed by the multiple-frames processing unit 210. Each of the second features may be a feature corresponding to one of the first features. Alternately, each of the second features tracked in a current frame being processed by the single-frame processing unit 220 may be a feature corresponding to one of second features tracked in a previously processed frame.

The number of second features tracked by the single-frame tracking unit 220 may be less than the number of first features. For example, when a scene point corresponding to one of the first features disappears in a sequence of frames, a second feature corresponding to the predetermined first feature may not be tracked. As described above, the single-frame processing unit 220 may process, one by one, the subsequent frames of the frames that are processed by the multiple-frames processing unit 210. Therefore, when the number of tracked second features decreases to be less than the threshold, a pose of each camera may not be tracked using the single-frame processing unit 220. Accordingly, when a frame of which the number of second features is less than the threshold is found among frames consecutive to the multiple-frames, multiple-frames including the found frame may be processed again by the multiple-frames processing unit 210.

That is, the multiple-frames processing unit 210 and the single-frame processing unit 220 may process a sequence of frames in turn. Each of the multiple-frames processing unit 210 and the single-frame processing unit 220 may provide information such as a frame number that is used to identify a frame to be processed, for example.

The multiple-frames processing unit 210 may extract first features that are common in multiple-frames using the multiple-frames and thus, may accurately extract the first features. The single-frame processing unit 220 may extract second features corresponding to the first features in a single frame and thus, may quickly extract the second features. That is, because the multiple-frames processing unit 210 and the single-frame processing unit 220 are alternately executed, the camera pose tracking apparatus 100 may balance accuracy and speed in tracking a camera pose.

The multiple-frames processing unit 210 may include a feature extractor 211, a feature tracking unit 212, a dynamic point detector 213, and a camera pose estimator 214.

The single-frame processing unit 220 may include a current frame setting unit 221, a current frame feature estimator 222, a current frame threshold comparator 223, and a current frame camera pose estimator 224.

Functions and operation principles of the above constituent elements will be further described with reference to FIG. 3 through FIG. 9.

Figure 3:
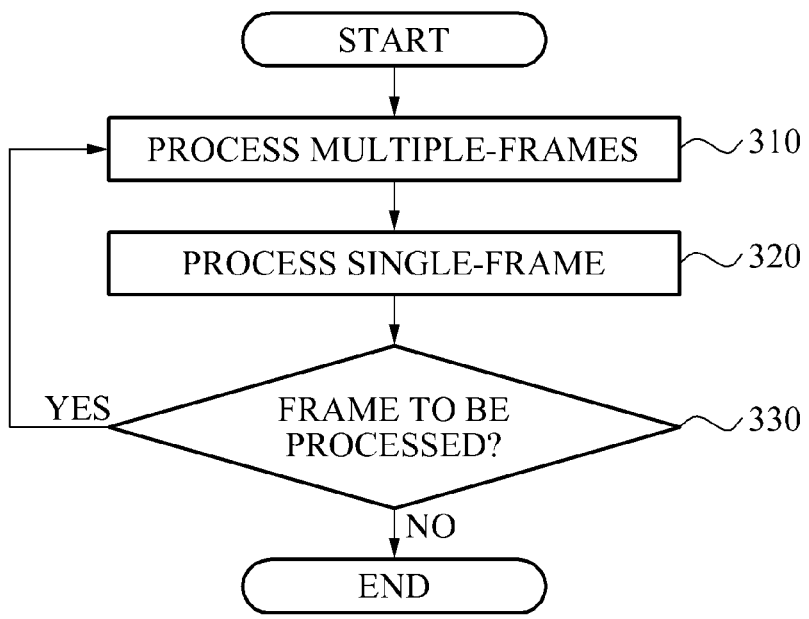
FIG. 3 illustrates a method of tracking a pose of a camera according to an embodiment.

FIG. 3 illustrates a method of tracking a pose of a camera according to an embodiment.

In operations 310 and 320, the camera pose tracking apparatus 100 may track a pose of each camera in each frame based on subsequent frames photographed using at least three cameras. The at least three cameras may include a left camera, a middle camera, and a right camera. Each frame may include a left image captured by the left camera, a middle image captured by the middle camera, and a right image captured by the right camera.

In operation 310, the multiple-frames processing unit 210 may extract and track at least one first feature in multiple-frames. In this example, the multiple-frames may be at least two consecutive frames. The multiple-frames processing unit 210 may estimate a pose of each camera in each of the multiple-frames based on tracked first features. The number of multiple-frames may be predetermined. Hereinafter, the number of multiple-frames is indicated as $N_f$. The multiple-frames processing unit 210 may extract, triangulate, and track features that are common in the multiple-frames that include $N_f$ frames. The multiple-frames processing unit 210 may detect and remove, from among the extracted features, features corresponding to dynamic scene points. For example, the first features may correspond to $N_p$ static first points that are successfully tracked up to an $N_f$-th frame of the multiple-frames among the features extracted by the multiple-frames processing unit 210. Using the first features, the multiple-frames processing unit 210 may simultaneously track $3N_f$ camera poses and $3N_p$ positions of first points in the $N_f$ frames.

In operation 320, the single-frame processing unit 220 may track a pose of each camera in each of at least one single-frame based on at least one second feature of each of the at least one single-frame. In this example, each of the at least one second feature may correspond to one of the at least one first feature, and each of the at least one single-frame may be a previous frame of an initial frame of which the number of tracked second features is less than a threshold, among frames consecutive to multiple-frames.

The single-frame processing unit 220 may search for second features matched with the aforementioned $N_p$ first features in an ($N_f$+1)-th frame that is a subsequent frame of the multiple-frames. The number of matched second features may be $N'_p$. The single-frame processing unit 220 may obtain 3D positions of the second features. Next, the single-frame processing unit 220 may estimate a pose of each camera in the ($N_f$+1)-th frame based on 2D-3D correspondences. Next, the single-frame processing unit 220 may search for third features matched with the $N'_p$ second features in an ($N_f$+2)-th frame. Each of the third features may match one of the first features. The above procedure may be repeated until the number of features matching the first features, found in an (N'+n)-th frame, is less than the threshold.

Operation 320 corresponding to a single-frame processing phase may be significantly quickly performed compared to operation 310 corresponding to a multiple-frames processing phase. To enable more frames to be processed in operation 320, the single-frame processing unit 220 may project unmatched features onto an $N_f$-th frame among the multiple-frames. The single-frame processing unit 320 may compare a local appearance between a projected point and an original feature.

After operation 320, operation 310 may be performed again. In this case, in operation 310, the multiple-frames processing unit 210 may extract again new first features in $N'_f$ frames. In operation 320, the single-frame processing unit 220 may track new second features matching the first features in consecutive frames.

The above two-phase procedure may be repeated until all the frames are processed.

Through the aforementioned two-phase procedure, features may be extracted and be tracked in subsequent frames. Each of the multiple-frames processing unit 210 and the single-frame processing unit 220 may automatically remove features that indicate dynamic points, and may use remaining features to track a pose of each camera in each frame.

In operation 330, whether there is a frame to be processed may be checked. When there is no frame to be processed, the procedure may be terminated. However, when there is a frame to be processed, operation 310 may be repeated.

Through the two-phase procedure, a camera motion of the input trinocular sequence may be robustly and efficiently recovered, and tracking efficiency may be enhanced without decreasing the accuracy of tracking.

The two-phase procedure including operations 310 and 320 will be further described with reference to FIG. 4 through FIG. 9.

Figure 4:
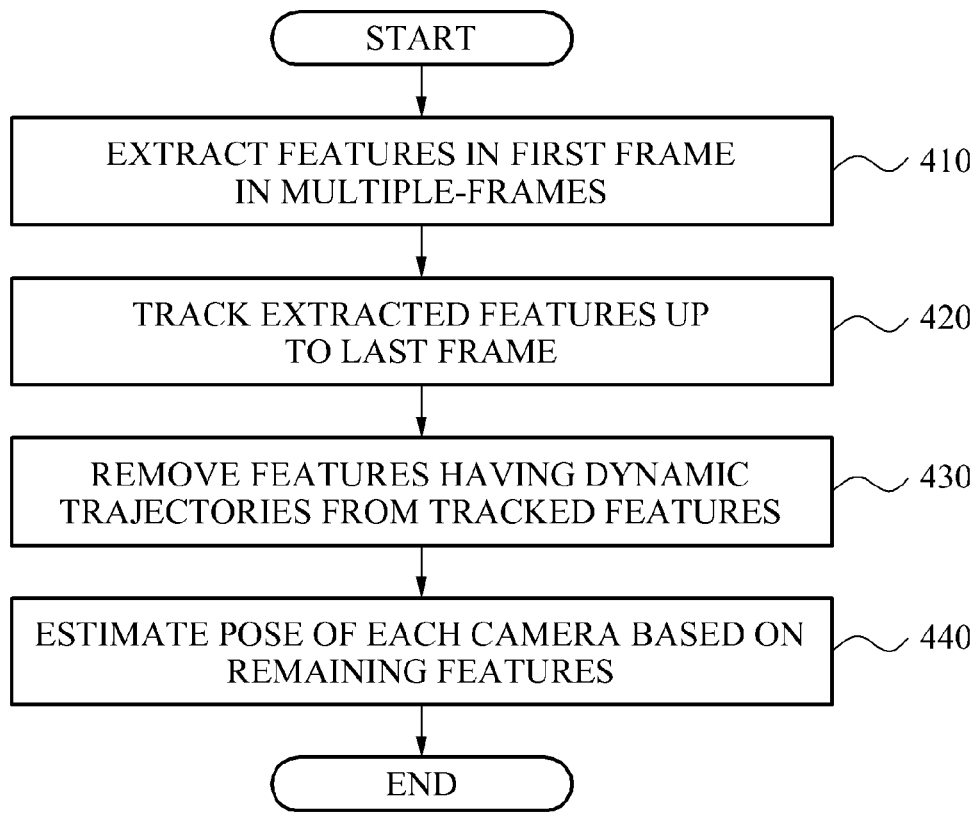
FIG. 4 illustrates a multiple-frames processing operation according to an embodiment.

FIG. 4 illustrates a multiple-frames processing operation according to an embodiment.

Operation 310 of FIG. 3 corresponding to a multiple-frames processing phase may include operations 410, 420, 430, and 440.

In operation 410, the feature extractor 211 may extract third features from at least three images of a first frame in multiple-frames. Operation 410 will be further described with reference to FIG. 5.

In operation 420, the feature tracking unit 212 may track the third features up to a last frame in the multiple-frames.

A typical feature tracking method may extract feature points in the first frame and then track the extracted feature points frame by frame. In the trinocular camera configuration, when each feature is tracked from a previous frame to a current frame, more candidates may be required to reduce a feature missing issue. Accordingly, it is possible to employ a 3D tracking algorithm in which the feature tracking unit 212 performs tracking only once and does not maintain a plurality of candidates.

Operation 420 will be further described with reference to FIG. 6.

In operation 430, the dynamic point detector 213 may determine the first features by removing features having dynamic trajectories from the tracked third features. Features remaining after the removal among the third features may be the first features. Operation 430 will be further described with reference to FIG. 7.

In operation 440, the camera pose estimator 214 may estimate a pose of each camera in each of the multiple-frames based on the first features. Operation 440 will be further described with reference to FIG. 8.

Figure 5:
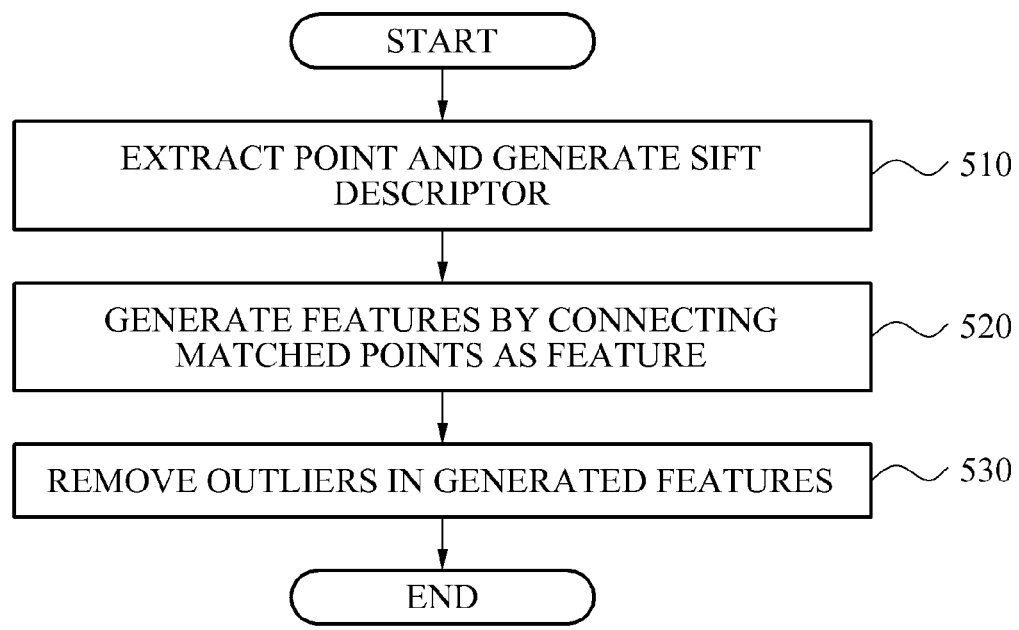
FIG. 5 illustrates a feature extracting operation according to an embodiment.

FIG. 5 illustrates a feature extracting operation according to an embodiment.

In operation 510 of generating a point and scale invariant feature transform (SIFT) descriptor, the feature extractor 211 may extract points from at least three images of a first frame in the multiple-frames. In this example, the point may be a Harris corner point detected by a corner and edge detector.

The feature extractor 211 may generate SIFT descriptors with a constant scale from the three images of the first frame in the multiple-frames. In general, scale variation among the three images is small.

In operation 520, the feature extractor 211 may generate third features by matching the extracted points using descriptor comparison between the generated SFIT descriptors and by connecting matched points as a feature. For acceleration, the feature extractor 211 may use k-d tree for the descriptor comparison.

The third features generated through matching may include an outlier. Hereinafter, the third feature generated through matching is expressed as a candidate feature x.

In operation 530, the feature extractor 211 may remove outliers in the generated third features using at least one of three geometry constraints. The three geometry constraints may include an epipolar constraint, a re-projection constraint, and a depth range constraint.

The feature extractor 211 may derive a fundamental matrix $F_{i \to j}$ from relative poses of views i and j based on the following Equation 2. Here, $F_{i \to j}$ may be a fundamental matrix of each of the views i and j, may be a fundamental matrix from the view i to the view j. The view may be an i-th camera view among three cameras.

$$F_{i \to j} = K_j^{-T}[t_{1 \to 2}]_x R_{1 \to 2} K_i \qquad \text{Equation 2}$$

In Equation 2, K denotes an intrinsic parameter, $t_{1 \to 2}$ denotes a translation vector from a first camera to a second camera among three cameras, $R_{1 \to 2}$ denotes a rotation matrix from the first camera to the second camera, and $[f]_x$ denotes a skew symmetric matrix of a vector t.

$[t]_x$ may be defined as Equation 3:

$$[t]_x = \begin{bmatrix} 0 & -t_3 & t_2 \\ t_3 & 0 & -t_1 \\ -t_2 & t_1 & 0 \end{bmatrix} \qquad \text{Equation 3}$$

Accordingly, the following Equation 4 may be established for all x. The feature extractor 211 may determine, as an outlier, the candidate feature x for which the following Equation 4 is not established.

$$[t]_x x = t \times x \qquad \text{Equation 4}$$

Re-projection validation may be applied as a second geometric test.

For example, the feature extractor 211 may set a left camera as a reference camera. When the left camera is set as the reference camera, the following Equation 5 may be established with respect to projective matrices [R|t] left of the left camera:

$$[R|t]_{left} = [I|0] \qquad \text{Equation 5}$$

Using the above set, the feature extractor 211 may compute projective matrices $[R|t]_{middle}$ of the middle camera and projective matrices $[R|t]_{right}$ of the right camera according to Equation 6 and Equation 7, respectively:

$$[R|t]_{middle} = [R|t]_{left \to middle} \qquad \text{Equation 6}$$

$$[R|t]_{right} = [R|t]_{left \to right} \qquad \text{Equation 7}$$

Using poses of cameras, the feature extractor 211 may triangulate a 3D position M of each candidate feature x.

Two-view triangulation may be more stable and efficient than three-view triangulation. Accordingly, the feature extractor 211 may initialize M using matched feature points $m_{left}$ in the left camera, that is, a left image, and matched feature points $m_{right}$ in the right camera, that is, the right image. For example, the feature extractor 211 may initialize M using a Samson suboptimal triangulation algorithm. In this example, the feature points may indicate a point in an image corresponding to a feature.

After initialization of M, the feature extractor 211 may further refine M by adding a feature points m middle in the middle camera, and by minimizing an energy function of the following Equation 8 based on $m_{left}$, $m_{middle}$, and $m_{right}$:

$$\min_M \sum_{i \in \{left, middle, right\}} \|\pi(K(R_i M + t_i)) - m_i\|_2^2 \qquad \text{Equation 8}$$

In Equation 8, a projection function $\pi(\cdot)$ may be defined as Equation 9:

$$\pi([X,Y,Z]^T) = (X/Z, Y/Z) \qquad \text{Equation 9}$$

A minimized value of the energy function may be a re-projection error of the candidate feature x.

The feature extractor 211 may use the minimized value of the energy function for the candidate feature x as a criterion of re-projection validation.

The feature extractor 211 may recognize, as an outlier, a candidate feature that does not satisfy one of the above-mentioned two geometry constraints.

Even though the candidate feature satisfies both of the above-mentioned two geometry constraints, the candidate feature may still be an outlier. In this case, a triangulated depth of the candidate feature is generally abnormal. The abnormal depth may indicate a very small or very large depth. Accordingly, the feature extractor 211 may use a depth range constraint to remove outliners. The feature extractor 211 may determine, as outliers, candidate features of which depth values are out of a specified depth range $[Z_{near}^i, Z_{far}^i]$, and may remove the candidate features determined as the outliners.

To automatically compute the depth range $[Z_{near}^i, Z_{far}^i]$ for each view i, the feature extractor 211 may use a two-step adaptive threshold selection strategy.

In a first step, for each view i, the feature extractor 211 may compute depth values of all the features appearing in the view i. The feature extractor 211 may select 80% smallest depth values from among the computed depth values. Using the selected depth values, the feature extractor 211 may compute the average depth value $Z_{avg}^i$ and variance $Z_{var}^i$ for the view i.

The feature extractor 211 may compute a minimum value $Z_{near}^i$ and a maximum value $Z_{far}^i$ of the depth range using the average depth value $Z_{avg}^i$ and the variance $Z_{var}^i$, according to Equation 10 and Equation 11, respectively:

$$Z_{near}^i = \max\{Z_{avg}^i - \lambda_Z Z_{var}^i, 0\} \qquad \text{Equation 10}$$

$$Z_{far}^i = Z_{avg}^i + \lambda_Z Z_{var}^i \qquad \text{Equation 11}$$

Here, a value of parameter $\lambda_Z$ may be set to "5".

However, the computed $Z_{near}^i$ is usually very close to zero and thus, may be useless.

In a second step, the feature extractor 211 may more accurately compute $Z_{near}^i$.

Three view pairs may be obtained using given triangulated views. Three view pairs may be expressed as Equation 12:

$$i, j \in \{1,2,3\}, i < j \qquad \text{Equation 12}$$

Because trinocular cameras have almost the same orientation, a trifling rotation component may be neglected. Accordingly, when $(X_i, Y_i, Z_i)^T$ is a 3D position of a feature point with respect to the i-th camera, the feature extractor 211 may compute $x_i$ and $x_j$ according to Equation 13 and Equation 14, respectively. Here, $x_i$ may be an x-coordinate on a focal image plane of the i-th view, and $x_j$ may be an x-coordinate of a focal image plane of the j-th view:

$$x_i = X_i / Z_i \qquad \text{Equation 13}$$

$$x_j = (X_i + t_{x, i \to j}) / Z_i \qquad \text{Equation 14}$$

Accordingly, the feature extractor 211 may compute a depth Z of a feature point in the i-th view according to Equation 15:

$$Z_i = t_{x, i \to j} \qquad \text{Equation 15}$$

The feature extractor 211 may compute $dx_{ij}$ according to Equation 16:

$$dx_{ij} = |x_i - x_j| \qquad \text{Equation 16}$$

As described above, selecting the minimum depth value $Z_{near}^i$ near may be equal to selecting a maximum value for $dx_{ij}$.

The feature extractor 211 may compute $dx_{ij}$ of each of feature candidates that appear in both the i-th view and the j-th view among candidate features. The feature extractor 211 may collect all the computed $dx_{ij}$ values and may sort the collected $dx_{ij}$ values in a descending order such as $\{d_{x1}, d_{x2}, \ldots\}$.

The feature extractor 211 may select, as a standard disparity value $dx_{\alpha, dx_{ij}}$ corresponding to the upper 80% in the sorted $dx_{ij}$ values.

The feature extractor 211 may compute the minimum depth value of the i-th view according to Equation 17:

$$Z_{near}^i = \min_j t_{x, i \to j} / (\lambda_Z dx_\alpha) \qquad \text{Equation 17}$$

Figure 6:
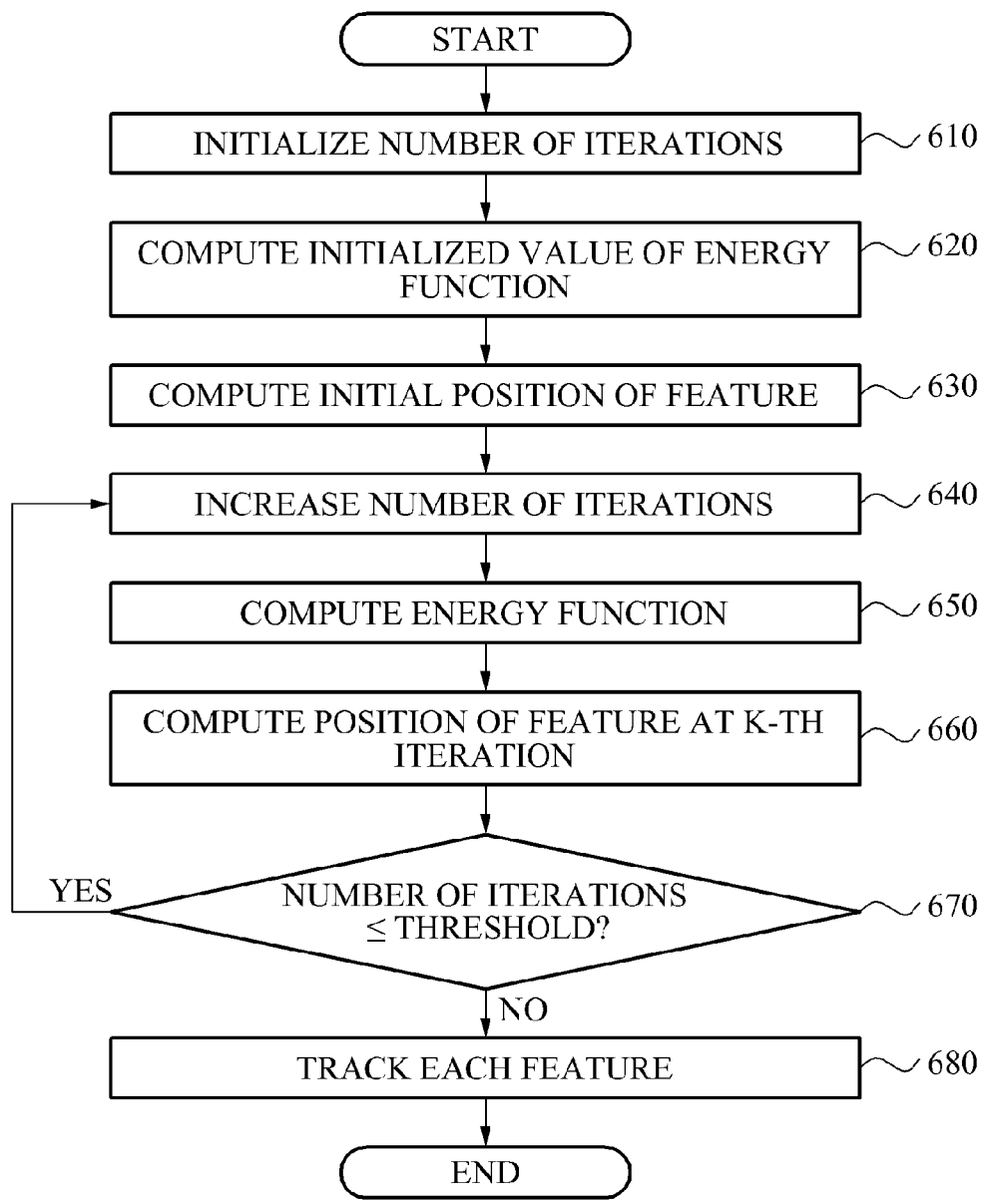
FIG. 6 illustrates a feature tracking operation according to an embodiment.

FIG. 6 illustrates a feature tracking operation according to an embodiment.

In operation 420 of FIG. 4, movement of third features in two frames may be tracked. Hereinafter, a method of computing a position of a feature in a current frame based on a position of a feature in a previous frame and a position movement will be described.

A 3D position of an extracted feature may be assumed to not vary between consecutive frame coordinate systems. The 3D position movement V of the feature may be formulated as Equation 18:

$$M' = M + V \qquad \text{Equation 18}$$

In Equation 18, M denotes the 3D position of the feature in the previous frame, and M may denotes the 3D position of the feature in the current frame.

The most basic measurement to compute the position movement may be a similarity between an image patch in the previous frame and an image patch in the current frame.

The feature tracking unit 212 may minimize an energy function f(v) based on Equation 19. In this example, the energy function f(v) may represent the similarity between the image patch in the previous frame and the image patch in the current frame.

$$f(V) = \sum_{i \in \{left, middle, right\}} \sum_{j \in W} \{I_i^{cur}[Loc(M+V, i, j)] - I_i^{pre}[Loc(M, i, j)]\}^2 \quad \text{Equation 19}$$

In Equation 19, $I_i^{pre}$ denotes an i-th image in the previous frame, $I_i^{cur}$ denotes an i-th image in the current frame, and Loc(M, i, j) denotes a position of a j-th pixel of a local window centered at projection of M on the i-th image plane.

The feature tracking unit 212 may compute Loc(M, i, j) according to Equation 20:

$$Loc(M,i,j) = \pi(K_i(R_iM+t_i)) + v_j \quad \text{Equation 20}$$

In Equation 20, $v_j$ denotes an offset of the j-th pixel from center of the local window.

In the following, for simplification, $I_i^k[Loc(M,i,j)]$ will be represented by $I_i^k(M,j)$. Here, k∈{pre,cur}. Accordingly, Equation 19 may be simplified as Equation 21:

$$f(V) = \sum_{i \in \{left, middle, right\}} \sum_{j \in W} [I_i^{cur}(M+V, j) - I_i^{pre}(M, j)]^2 \quad \text{Equation 21}$$

Equation 21 may be modified as Equation 22:

$$f(V) = \sum_{i \in \{left, middle, right\}} \sum_{j \in W} [I_i^{cur}(M+V, j) - I_i^{pre}(M-V, j)]^2 \quad \text{Equation 22}$$

Also, Equation 18 may be modified as Equation 23, and M may be defined as Equation 23:

$$M' = M + 2V \quad \text{Equation 23}$$

When the 3D movement V is small, terms $I_i^{cur}$ and $I_i^{pre}$ may be approximated as Equation 24:

$$I_i^k(M \pm V, j) \approx I_i^k(M, j) \pm \frac{\partial I_i^k(M, j)}{\partial M} V \quad \text{Equation 24}$$

In Equation 24, k ∈ {pre, cur}.

The feature tracking unit 212 may analytically compute $$\frac{\partial I_i^k(M, j)}{\partial M}$$

based on a chain rule according to Equation 25:

$$\frac{\partial I_i^k(M, j)}{\partial M} = \frac{\partial I_i^k}{\partial m_j} \frac{\partial m_j}{\partial m_i} \frac{\partial m_i}{\partial M_c} \frac{\partial M_c}{\partial M} \quad \text{Equation 25}$$

In Equation 25, $M_c$ denotes a 3D position in a camera coordinate system, $m_i$ denotes a 2D position in the 2D plane, and $M_c$ denotes a 2D position of the j-th pixel within the local window centered at $m_i$.

Because Equation 26, Equation 27, and Equation 28 are established, Equation 29 may also be established. The feature tracking unit 212 may compute $$\frac{\partial I_i^k(M, j)}{\partial M}$$

according to Equation 29:

$$M_c = R_i M + t_i \quad \text{Equation 26}$$

$$m_i = \pi(K_i M_c) \quad \text{Equation 27}$$

$$m_j = m_i + v_j \quad \text{Equation 28}$$

$$\frac{\partial I_i^k(M, j)}{\partial M} = g_i^k(m_j) \cdot H(M_c) \cdot R_i \quad \text{Equation 29}$$

In Equation 29, $g_i^k$ denotes an image gradient, and $H([X\;Y\;Z]^T)$ is a Jacobian matrix of $\pi(K_i[X\;Y\;Z]^T)$ and may be defined as Equation 30:

$$H\left(\begin{bmatrix} X \\ Y \\ Z \end{bmatrix}\right) = \begin{bmatrix} f_x/Z & 0 & -f_x X/Z^2 \\ 0 & f_y/Z & -f_y Y/Z^2 \end{bmatrix} \quad \text{Equation 30}$$

Combining Equation 22, Equation 24, and Equation 29, f(V) may be approximated as Equation 31:

$$f(V) \approx \sum_{i \in \{left, middle, right\}} \sum_{j \in W} (g_{i,j} \cdot T_i \cdot V - d_{i,j})^2 \quad \text{Equation 31}$$

Here, $g_{i,j}$, $T_i$, and $d_{i,j}$ may be defined as Equation 32, Equation 33, and Equation 34, respectively:

$$g_{i,j} = g_i^{pre}(m_j) + g_i^{cur}(m_j) \quad \text{Equation 32}$$

$$T_i = H(M_c) \cdot R_i \quad \text{Equation 33}$$

$$d_{i,j} = I_i^{pre}(M,j) - I_i^{cur}(M,j) \quad \text{Equation 34}$$

Here, subscripts may indicate dependencies. For example, $HR_i$ may indicate that $HR_i$ only depends on a view index and is irrelevant to image patches. Minimization of f(V) in Equation 31 may be equal to solve a 3×3 system of Equation 35:

$$\left[\sum_{i \in \{left, middle, right\}} T_i^T \left(\sum_{j \in W} g_{i,j}^T g_{i,j}\right) T_i\right] \cdot V = \quad \text{Equation 35}$$

$$\sum_{i \in \{left, middle, right\}} T_i^T \cdot \left( \sum_{j \in W} g_{i,j}^T d_{i,j} \right)$$

The feature tracking unit 212 may employ an iterative scheme to obtain a solution of the 3D position movement V.

In operation 610, the feature tracking unit 212 may initialize the number of iterations k to "zero".

In operation 620, the feature tracking unit 212 may compute an initialized value $V^{(0)}$ of an energy function according to Equation 35.

In operation 630, the feature tracking unit 212 may compute an initial position $M^{(0)}$ of a feature according to Equation 36:

$$M^{(0)} = M + 2V^{(0)} \quad \text{Equation 36}$$

In operation 640, the feature tracking unit 212 may increase the number of iterations k by each "1".

In operation 650, the feature tracking unit 212 may compute the energy function $f(V^{(k)})$ at k-th iteration according to Equation 37:

$$f(V^{(k)}) = \sum_{i \in \{left, middle, right\}} \sum_{j \in W}$$

$$[I_i^{curr}(M'^{(k-1)} + V^{(k)}, j) - I_i^{pre}(M - V^{(k)}, j)]^2$$

In operation 660, the feature tracking unit 212 may compute the position $M^{(k)}$ of the feature at the k-th iteration according to Equation 38:

$$M^{(k)} = M^{(k-1)} + 2V^{(0)} \quad \text{Equation 38}$$

When k is less than or equal to a predetermined threshold in operation 670, the feature tracking unit 212 may perform again operation 640. When k reaches the predetermined threshold, the feature tracking unit 212 may terminate iterative computation of $f(V^{(k)})$ and $M^{(k)}$.

In operation 680, the feature tracking unit 212 may track each feature in the current frame based on the computed position. For example, the feature tracking unit 212 may simultaneously track correspondences between features in consecutive frames and 3D positions of the frames.

The feature tracking unit 212 may track each of third features up to the last frame in the multiple-frames by sequentially applying operations 610 through 680 to the consecutive frames of the multiple-frames.

Figure 7:
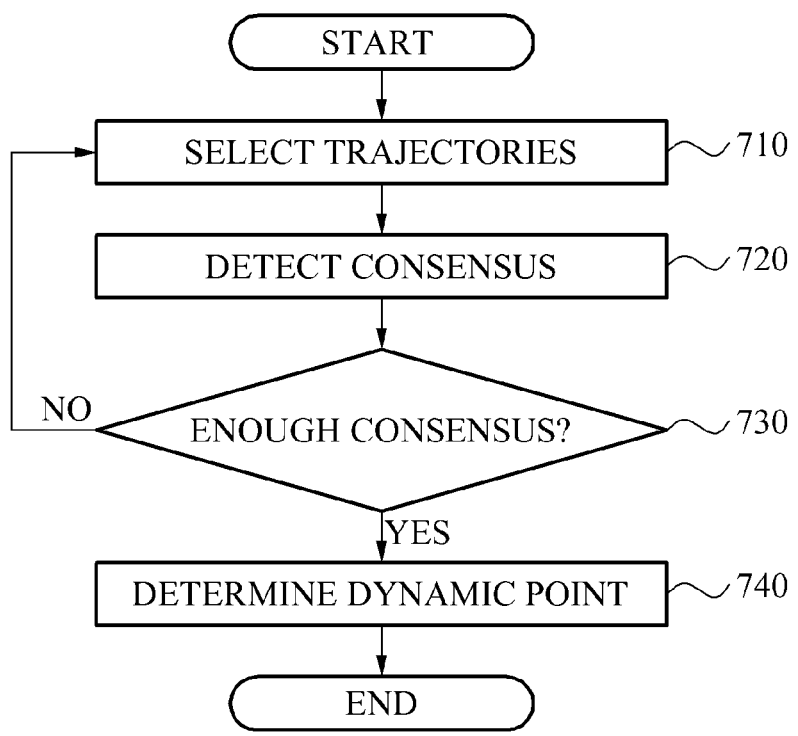
FIG. 7 illustrates a dynamic point detecting operation according to an embodiment.

FIG. 7 illustrates a dynamic point detecting operation according to an embodiment.

FIG. 7 may relate to the third feature that is extracted and tracked in operations 410 and 420 of FIG. 4.

To detect dynamic points, for example, a 2D background subtraction algorithm proposed by Yaser Sheikh et al. in "background subtraction for freely moving cameras" may be generalized to apply in the 3D trajectory space. Considering that three cameras are static, static points may be accordingly considered as being moving rigidly in the way inverse to the actual motion of the trinocular rig. Accordingly, trajectories of the static points may lie in a low dimension subspace.

A trajectory of a point may be defined as catenation of 3D coordinates within consecutive frames.

When $N_p$ points are extracted and tracked in $N_f$ multiple-frames in operations 410 and 420, the dynamic point detector 213 may compute a trajectory $w_i$ of an i-th point according to Equation 39:

$$q_i = [M_{i,1}^T \ldots M_{i,N_f}^T]^T \in R^{3N_f \times 1} \quad \text{Equation 39}$$

In Equation 39, $M_{i,j}$ denotes a local coordinate in a j-th frame.

The dynamic point detector 213 may arrange all the $N_p$ points into a $3N_f \times N_p$ matrix W as expressed by Equation 40:

$$W = [w_1 \ldots w_{N_p}] = \begin{bmatrix} M_{1,1} & \ldots & M_{N_p,1} \\ \vdots & & \vdots \\ M_{1,N_f} & \ldots & M_{N_p,N_f} \end{bmatrix} \quad \text{Equation 40}$$

When each of the points is static, $M_{i,j}$ may be equal to $[R|t]_j \tilde{M}_i$ for all $i \in N_p$. Here, $\tilde{M}_i$ denotes a four-dimensional (4D) world homogeneous coordinate. $[R|t]_j$ denotes a 3×4 matrix of a rigid motion with respect to the j-th frame.

Accordingly, W may be factored as Equation 41:

$$W = \begin{bmatrix} [R|t]_1 \\ \vdots \\ [R|t]_{N_f} \end{bmatrix} [\tilde{M}_1 \ldots \tilde{M}_{N_p}] \quad \text{Equation 41}$$

The factorization according to Equation 41 suggests that a rank of W is at most 4. Trajectories of a static point may lie in a subspace spanned by four basic trajectories.

A random sample consensus (RANSAC) algorithm may be used to robustly compute the best estimate of the 4D trajectory subspace while identifying trajectories lying within the subspace. At each iteration, four trajectories indicated as $w_1$, $w_2$, $w_3$, and $w_4$ may be randomly selected to form a subspace, and a matrix $W_4(W_4^T W_4)^{-1} W_4^T$ may be used to project other trajectories into this subspace. Here, $W_4 = [w_1 \ldots w_4]$. To evaluate a likelihood that a given trajectory may belong to the subspace, the dynamic point detector 213 may directly measure a Euclidean distance between an original trajectory and a projected trajectory.

In practice, it may be difficult to tune a threshold for the Euclidean distance defined in $3N_f$-space in order to determine whether the trajectory lies in the subspace. Instead, to evaluate $w_1$, the dynamic point detector 213 may split the projected trajectory $W_4(W_4^T W_4)^{-1} W_4^T w_i$ into $N_f$ frame points $M'_{i,1}, \ldots, M'_{i,N_f}$. The dynamic point detector 213 may compute a projection error $f(w_i)$ according to Equation 42:

$$f(w_i) = \quad \text{Equation 42}$$

$$\sum_{j=1 \ldots N_f} \sum_{k \in \{left, middle, right\}} \|\pi(K_k(R_k M'_{i,j} + t_k)) - m_{i,j,k}\|^2$$

In Equation 42, $m_{i,j,k}$ denotes a position of an i-th point in a k-th image of the j-th frame.

In operation 710, the dynamic point detector 213 may select four trajectories $w_1$, $w_2$, $w_3$, and $w_4$ to form the subspace.

In operation 720, the dynamic point detector 213 may detect a consensus in the selected four trajectories $w_1$, $w_2$, $w_3$, and $w_4$ based on the RANSAC algorithm.

When there is enough consensus in data to support the selected trajectories in operation 730, the dynamic point detector 213 may terminate the routine and otherwise, operation 710 may be repeated. The dynamic point detector 213 may select another four trajectories until the maximum consensus set is found.

In operation 740, the dynamic point detector 213 may consider, as dynamic points, trajectories that do not belong to the maximum consensus set.

As described above, the dynamic point detector 213 may compute the 4D trajectory subspace of each third feature, and may determine whether each third feature has a dynamic trajectory based on the computed 4D trajectory subspace.

The dynamic point detector 213 may determine first features by removing features having dynamic trajectories from among the third features tracked up to the last frame. For example, the first features may be features that are tracked up to the last frame among the third features extracted from the first frame and do not have the dynamic trajectory.

Figure 8:
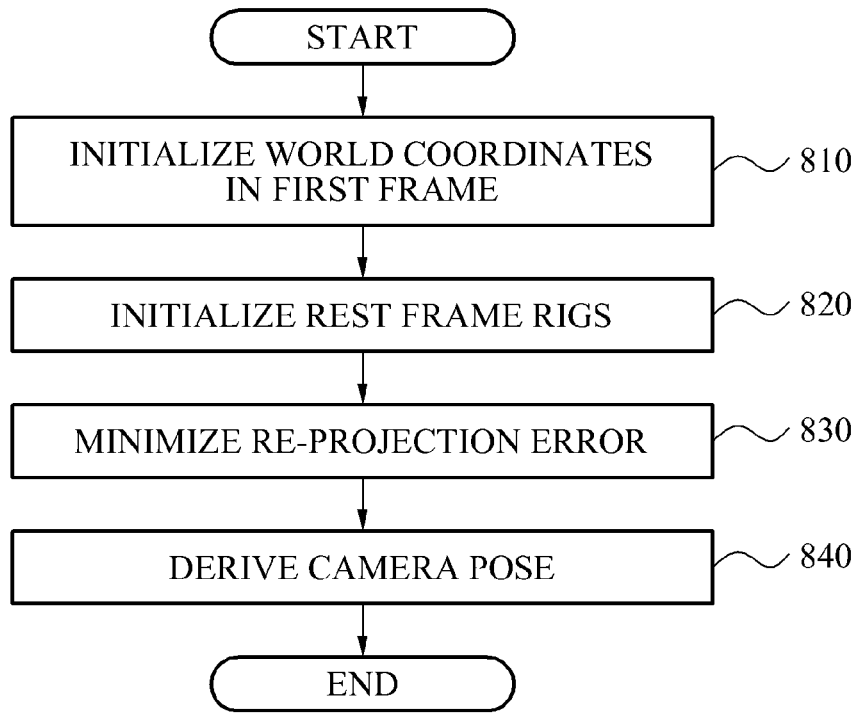
FIG. 8 illustrates a camera pose estimating operation according to an embodiment.

FIG. 8 illustrates a camera pose estimating operation according to an embodiment.

When first features are extracted, the extracted first features are tracked in $N_f$ frames, and dynamic points are removed in operation 210, the camera pose estimator 214 may simultaneously estimate world coordinates of $N_p$ points and motions of $3N_f$ cameras via a structure-from-motion technique. Each of $N_p$ points is indicated as $M_i$. Here, i=1, ..., $N_f$.

Instead of estimating the motions of $3N_f$ cameras, the camera pose estimator 214 may estimate only $N_f$-1 frame rigs for the currently tracked subsequence. Relative poses among three cameras are known to be fixed. A first frame rig of the subsequence may be set to be [I|0] for the first frame of the whole sequence, or may be estimated in the previously tracked subsequence. Accordingly, the camera pose estimator 214 may estimate only $N_f$-1 frame rigs for the currently estimated catenation.

The camera pose estimator 214 may set the frame rig at the left camera. The camera pose estimator 214 may derive $3N_f$ camera poses from the frame rig according to Equation 43:

$$[R|t]_{j,left} = [R|t]_j$$

$$[R|t]_{j,middle} = [R_{left \to middle} R_j | R_{left \to middle} t_j + t_{left \to middle}]$$

$$[R|t]_{j,right} = [R_{left \to right} R_j | R_{left \to right} t_j + t_{left \to right}] \quad \text{Equation 43}$$

In Equation 43, $[R|t]_{j,k}$ denotes a position of one of 3N cameras, and j=1 ... $N_f$, k∈{left, middle, right} $[R|t]_j$ denotes the frame right, and j=1 ... $N_f$.

In operation 810, because $N_p$ points are triangulated in the first frame of the current subsequence, the camera pose estimator 214 may initialize world coordinates of the $N_p$ points in the first frame through inverse transformation by a known frame rig.

In operation 820, the camera pose estimator 214 may initialize the rest frame rigs by employing non-linear optimization via a Levenberg-Marquardt algorithm and a camera pose estimation method proposed by Long Quan et al.

For example, the camera pose estimator 214 may perform initialization for the j-th frame according to Equation 44:

$$\min_{[R|T]_j} \sum_{i \in N_j} \sum_{k \in \{left, middle, right\}} \|m_{i,j,k} - m'_{i,j,k}\|^2 \quad \text{Equation 44}$$

In Equation 44, $m_{i,j,k}$ denotes a 2D measurement of an i-th point in a k-th image of the j-th frame, $m'_{i,j,k} = \pi(K_k(R_{j,k}M_i + t_{j,k}))$ denotes a re-projection of the i-th point into the k-th image of the j-th frame, and $N_j$ denotes the number of visible points in the j-th frame.

In operation 830 after initialization, the camera pose estimator 214 may minimize the re-projection error with respect to all the 3D points and camera parameters according to Equation 45:

$$\min_{\substack{M_1 \ldots M_N \\ [R|t]_2 \ldots [R|t]_M}} \sum_{i \in N_p} \sum_{j \in 1 \ldots N_f} \sum_{k \in \{left, middle, right\}} \|m_{i,j,k} - m'_{i,j,k}\|^2 \quad \text{Equation 45}$$

Unlike Equation 44, Equation 45 corresponding to a normal equation may have a sparse block structure due to a lack of interaction among parameters for different 3D points and cameras.

Because a sparse variant of the Levenberg-Marquardt algorithm avoids storing and operating on zero elements, a gain may be obtained from a zero pattern of the normal equation. The sparse block structure may be exploited to gain tremendous computation benefits by employing the sparse variant of the Levenberg-Marquardt algorithm. It may be referred to as a bundle adjustment and may be used as a last standard step of almost every feature-based structure-from-motion system.

In particular, for Equation 44 and Equation 45, the camera pose estimator 214 may parameterize [R|t] by employing three parameters for ω, parameterization of an incremental rotation matrix $R_\omega^{incr}$, and three parameters for a camera center c, based on, for example, a method proposed by Noah Snavely et al. as shown in Equation 46:

$$R_\omega^{incr} = I + \sin\theta [\hat{n}]_x + (1 - \cos\theta)[\hat{n}]_x^2, \omega = \theta\hat{n}$$

$$R = R_\omega^{incr} R^{init}$$

$$t = -Rc \quad \text{Equation 46}$$

In Equation 46, $[\hat{n}]_x$ denotes a skew symmetric matrix as defined in Equation 3, and $R^{init}$ denotes an initial rotation matrix. The camera pose estimator 214 may project $M_i$ to three views in the j-th frame according to Equation 47:

$$m_{i,j,left}' = \pi(K_{left}(R_{\omega_j}^{incr} R_j^{init}(M_i - c_j)))$$

$$m_{i,j,middle}' = \pi(K_{middle}(R_{left \to middle} R_{\omega_j}^{incr} R_j^{init}(M_i - c_j) + t_{left \to middle}))$$

$$m_{i,j,right}' = \pi(K_{righ}(R_{left \to right} R_{\omega_j}^{incr} R_j^{init}(M_i - c_j) + t_{left \to right})) \quad \text{Equation 47}$$

For f(v) in Equation 44 and Equation 45, the camera pose estimator 214 may analytically compute the Jacobian matrix based on a chain rule.

The camera pose estimator 214 may compute the middle view $M_{middle}$ according to Equation 48:

$$M_{middles} = R_{left \to middle} R_\omega^{incr} R^{init}(M - c) + t_{left \to middle} \quad \text{Equation 48}$$

In Equation 48, the coordinate of M may be represented with respect to the middle camera.

The camera pose estimator 214 may compute $$\frac{\partial m'_{middle}}{\partial \omega_k}, \frac{\partial m'_{middle}}{\partial c}, \text{ and } \frac{\partial m'_{middle}}{\partial M}$$

according to Equation 49, Equation 50, and Equation 51, respectively:

$$\frac{\partial m'_{middle}}{\partial \omega_k} = H(M_{middle}) \cdot R_{left \to middle} \frac{\partial R^{incr}_{\omega}}{\omega_k} R^{init} \cdot (P-c), \quad \text{Equation 49}$$

$$k = 1 \ldots 3$$

$$\frac{\partial m'_{middle}}{\partial c} = -H(M_{middle}) \cdot R_{left \to middle} R^{incr}_{\omega j} R^{init}_j \quad \text{Equation 50}$$

$$\frac{\partial m'_{middle}}{\partial M} = H(M_{middle}) \cdot R_{left \to middle} R^{incr}_{\omega j} R^{init}_j \quad \text{Equation 51}$$

Here, H(•) may be equal as defined in Equation 30. Terms $$R_{left \to middle} \frac{\partial R^{incr}_{\omega}}{\omega_1} R^{init} \text{ and } R_{left \to middle} R^{incr}_{\omega j} R^{init}_j$$

may be the same for all the points. Once a frame rig is updated, the camera pose estimator 214 may pre-compute the terms $$R_{left \to middle} \frac{\partial R^{incr}_{\omega}}{\omega_1} R^{init} \text{ and } R_{left \to middle} R^{incr}_{\omega j} R^{init}_j.$$

$$\frac{\partial m'_{middle}}{\partial c} \text{ and } \frac{\partial m'_{middle}}{\partial M}$$

only differ by a single and do not need to be computed twice. The camera pose estimator 214 may derive the Jacobian matrix for the right view using a similar method as the described method.

In operation 840, the camera pose estimator 214 may derive $3N_f$-camera poses from frame rigs according to Equation 43.

Figure 9:
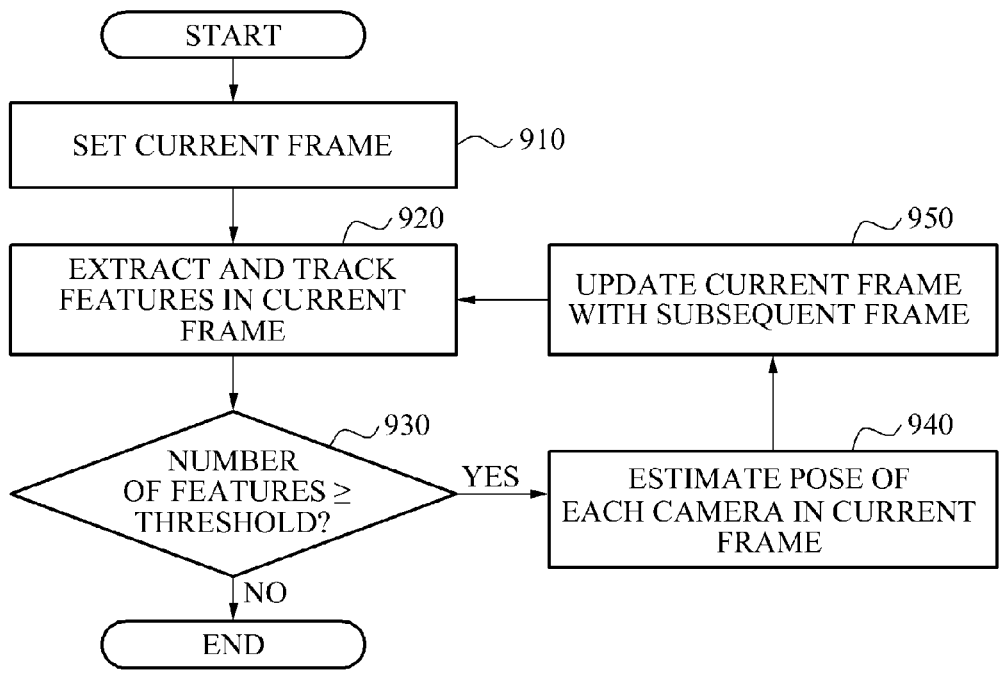
FIG. 9 illustrates a single-frame processing operation according to an embodiment.

FIG. 9 illustrates a single-frame processing operation according to an embodiment.

Operation 320 of FIG. 3 corresponding to a single-frame processing phase may include operations 910, 920, 930, 940, and 950.

In operation 320, a pose of each camera may be estimated in a current frame. The current frame may be initialized by a linear N-point camera pose determination method. In addition, operation 320 may be optimized based on Equation 43 and Equation 44. One of differences between operation 310 corresponding to the multi-frames processing phase and operation 320 corresponding to the single-frame processing phase is that the bundle adjustment may become very local in operation 320. That is, points adjustable in operation 320 may be limited to points appearing in the current frame and the current frame rig. To prevent the local optimization, the single-frame processing unit 220 may also measure projection of the points in the previous frames. Accordingly, camera parameters of involved previous frames may be used as constant in Equation 45.

Operation 320 may be performed after the first features are extracted and tracked in operation 310.

In operation 910, the current frame setting unit 221 may set a subsequent frame of the multiple-frames as a current frame.

In operation 920, the current frame feature estimator 222 may extract and track second features in the current frame. Each of the first features may correspond to one of the first features extracted and tracked in operation 310. For example, the second features may correspond to the first features extracted in the multiple-frames that consecutively appear in the current frame.

In operation 930, the current frame threshold comparator 223 may check whether the number of second features extracted in the current frame is greater than or equal to a threshold. When the number of extracted second features is greater than or equal to the threshold, operation 940 may be performed.

Conversely, when the number of extracted second features is less than the threshold, operation 320 corresponding to the single-frame processing phase may be terminated. After terminating operation 320, when there is a frame to be processed in operation 330, the multi-frames processing unit 210 may be executed again by performing operation 310 again. Here, the multiple-frames in operation 310 may correspond to at least two consecutive frames that start in the current frame.

In operation 940, the current frame camera pose estimator 224 may estimate a pose of each camera in the current frame.

In operation 950, the current frame setting unit 221 may set a subsequent frame of the current frame as a new current frame. Next, operation 920 may be repeatedly performed. That is, the current frame feature estimator 222 may extract second features in the new current frame.

Technical description made above with reference to FIG. 1 through FIG. 8 may be applied as is to the present embodiment and thus, further detailed description will be omitted here.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method to track a camera pose based on frames photographed using at least three cameras, the method comprising:
extracting and tracking at least one first feature in multiple-frames, and tracking a pose of each camera in each of the multiple-frames based on first features; and
tracking a pose of each camera in each of at least one single-frame based on at least one second feature of each of the at least one single-frame,
wherein each of the at least one second feature corresponds to one of the at least one first feature, and each of the at least one single-frame is a previous frame of an initial frame of which the number of tracked second features is less than a threshold, among frames consecutive to multiple-frames.

2. The method of claim 1, wherein the tracking comprises:
extracting third features from at least three images of a first frame in the multiple-frames;
tracking the third features up to a last frame in the multiple-frames;
determining the first features by removing features having dynamic trajectories from the tracked third features; and
estimating a pose of each camera in each of the multiple-frames based on the first features.

3. The method of claim 2, wherein the extracting of the third features comprises:
extracting points from the at least three images of the first frame to generate scale invariant feature transform (SIFT) descriptors; and
generating the third features by matching the extracted points using descriptor comparison between the generated SFIT descriptors and by connecting matched points as a feature.

4. The method of claim 3, wherein the extracting of the third features further comprises:
removing outliers in the third features using geometry constraints.

5. The method of claim 4, wherein the geometry constraints comprise at least one of an epipolar constraint, a re-projection constraint, and a depth range constraint.

6. The method of claim 1, wherein the tracking comprises:
setting a subsequent frame of the multiple-frames as a current frame;
extracting the second features corresponding to one of the first features in the current frame;
estimating a pose of each camera in the current frame when the number of second features is greater than or equal to the threshold; and
setting a subsequent frame of the current frame as a new current frame, and extracting the second features in the new current frame when the number of second features is greater than or equal to the threshold.

7. The method of claim 6, wherein the tracking comprises:
tracking again a pose of each camera in each of the multiple-frames when the number of second features is less than the threshold.

8. A non-transitory computer-readable recording medium storing a program to implement the method of claim 1.

9. An apparatus for tracking a camera pose based on frames photographed using at least three cameras, the apparatus comprising:
a multiple-frames processing unit to extract and track at least one first feature in multiple-frames, and to track a pose of each camera in each of the multiple-frames based on first features; and
a single-frame processing unit to track a pose of each camera in each of at least one single-frame based on at least one second feature of each of the at least one single-frame,
wherein each of the at least one second feature corresponds to one of the at least one first feature, and each of the at least one single-frame is a previous frame of an initial frame of which the number of tracked second features is less than a threshold, among frames consecutive to multiple-frames.

10. The apparatus of claim 9, wherein the multiple-frames processing unit comprises:
a feature extractor to extract third features from at least three images of a first frame in the multiple-frames;
a feature tracking unit to track the third features up to a last frame in the multiple-frames;
a dynamic point detector to determine the first features by removing features having dynamic trajectories from the tracked third features; and
a camera pose estimator to estimate a pose of each camera in each of the multiple-frames based on the first features.

11. The apparatus of claim 10, wherein the dynamic point detector computes a fourth-dimensional (4D) trajectory subspace of each of the third features, and determines whether each of the third features has a dynamic trajectory based on the 4D trajectory subspace.

12. The apparatus of claim 10, wherein the feature extractor extracts points from the at least three images of the first frame to generate scale invariant feature transform (SIFT) descriptors, and generates the third features by matching the extracted points using descriptor comparison between the generated SFIT descriptors and by connecting matched points as a feature.

13. The apparatus of claim 12, wherein the feature extractor removes outliers in the third features using geometry constraints.

14. The apparatus of claim 13, wherein the geometry constraints comprise at least one of an epipolar constraint, a re-projection constraint, and a depth range constraint.

15. The apparatus of claim 9, wherein the single-frame processing unit comprises:
a current frame setting unit to set a subsequent frame of the multiple-frames as a current frame;
a current frame feature estimator to extracting the second features corresponding to one of the first features in the current frame; and
a threshold comparator to estimate a pose of each camera in the current frame when the number of second features is greater than or equal to the threshold,
wherein when the number of second features is greater than or equal to the threshold, the current frame feature setting unit sets a subsequent frame of the current frame as a new current frame, and extracts the second features in the new current frame.

16. The apparatus of claim 15, wherein when the number of second features is less than the threshold, the multi-frames processing unit is executed again.

17. A method to track a pose of each of at least three cameras, the method comprising:
extracting a first static feature from at least two consecutive frames photographed using the at least three cameras;
tracking the extracted first static feature from the at least two consecutive frames;
estimating a pose of each of the at least three cameras based on the tracked first static feature;
extracting a second static feature from at least one single frame photographed using the at least three cameras; and tracking the pose of each of the at least three cameras in each single frame based on the extracted second static feature.

18. The method of claim 17, wherein the second static feature corresponds to the first static feature.

* * * * *